United States Patent Office 2,962,191
Patented Nov. 29, 1960

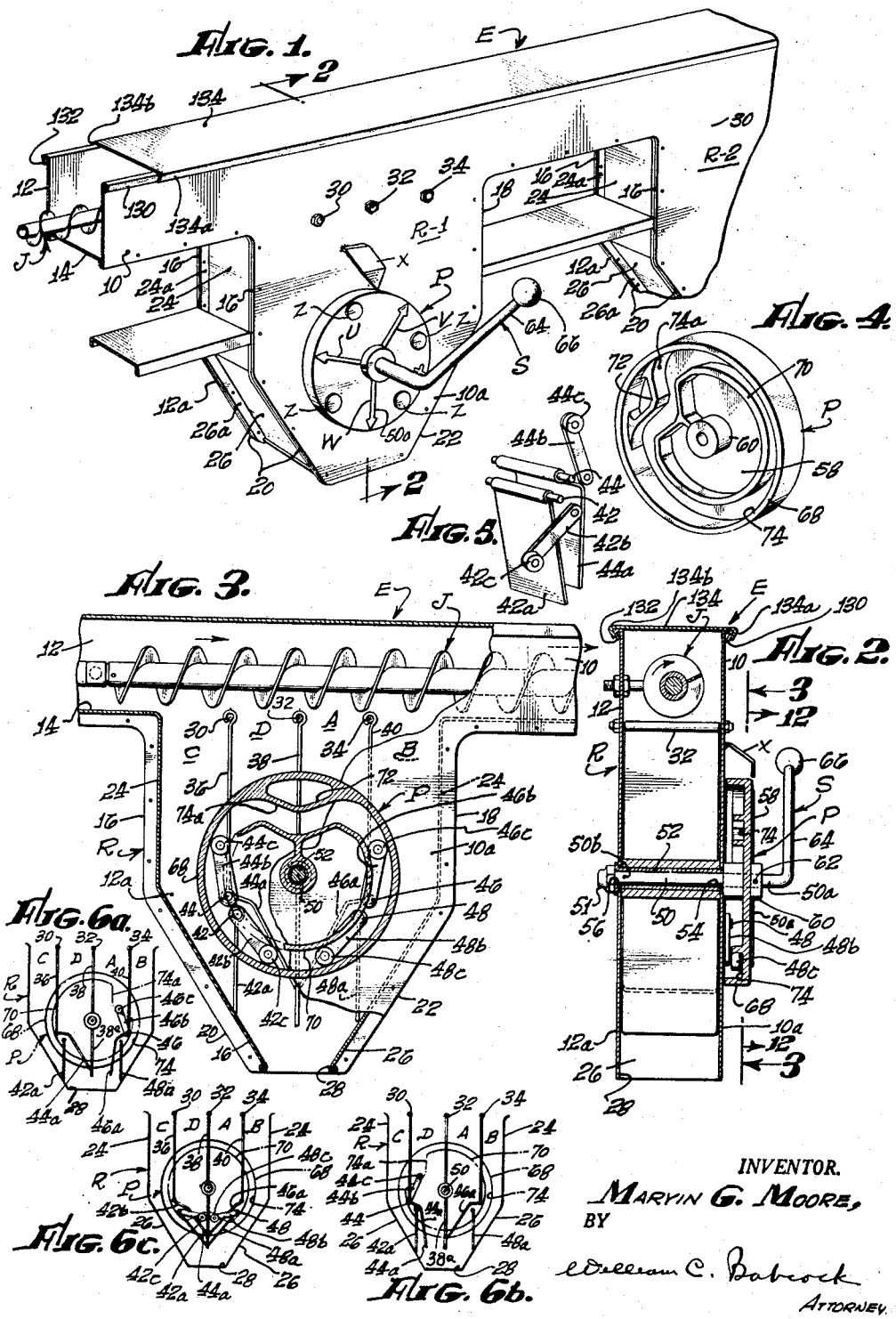

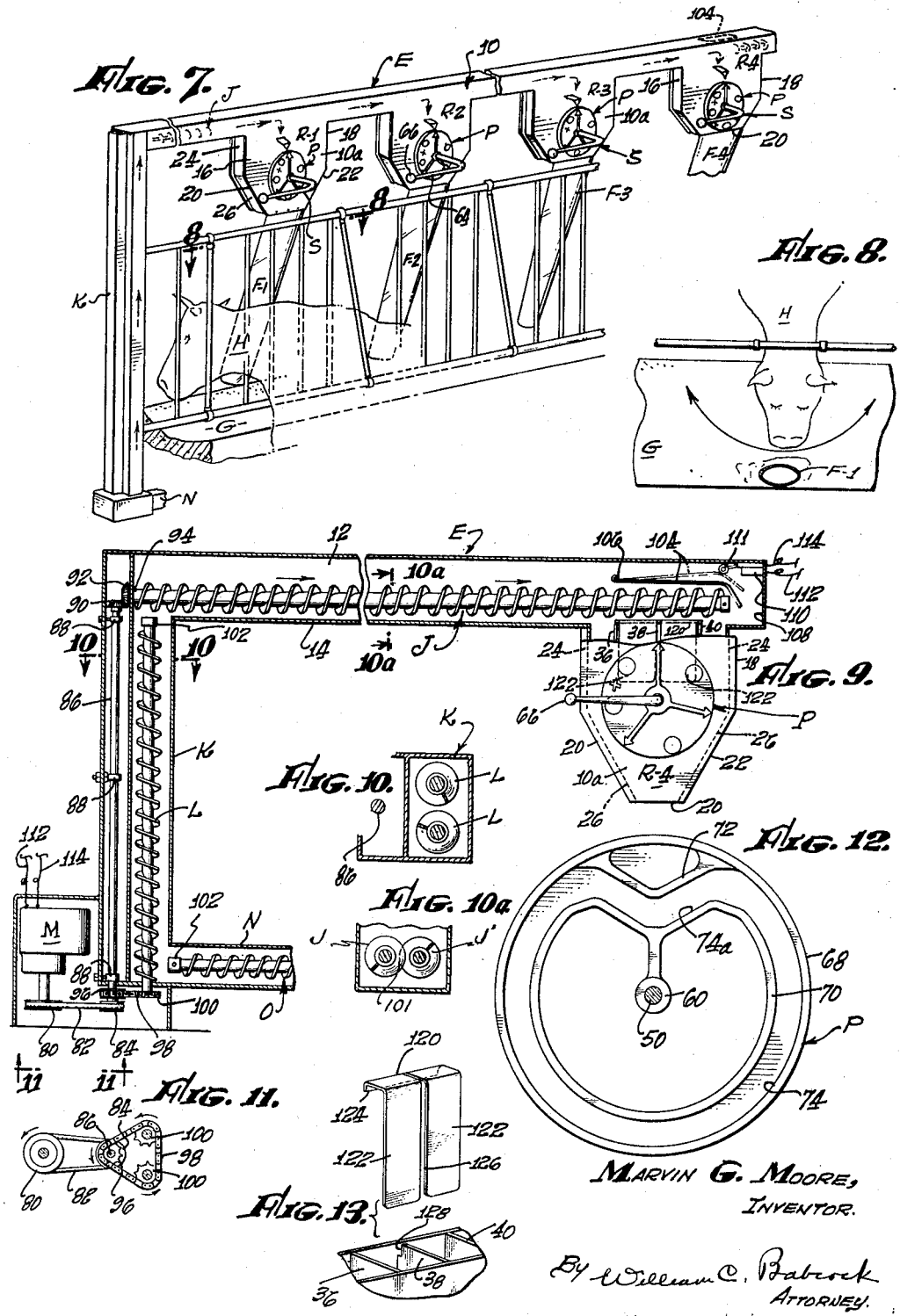

2,962,191

DISPENSING DEVICE

Marvin G. Moore, 2621 Adams St.,
Long Beach 10, Calif.

Filed Apr. 8, 1957, Ser. No. 651,383

10 Claims. (Cl. 222—29)

The present invention relates generally to farm and ranch equipment, and more particularly to a device by means of which predetermined quantities of feed or other granular material may be delivered to and dispensed at a variety of locations.

During the past few years the use of screw conveyors for moving feed and other granular materials has been widely adopted in medium to large-scale farming and ranching operations, particularly those wherein dairy herds must be fed indoors, as well as turkey and chicken farms, and the like. Such use of screw conveyors has facilitated the rapid and easy movement of large quantities of feed materials, and in most instances has reduced such operational costs in that the personnel previously required is less, or if not reduced, may be diverted for other tasks.

The primary purpose in devising the present invention is to augment the convenience of screw conveyors utilized on farms and ranches by providing a sequence of dispensing units that may be disposed at specific locations, and by a simple manual adjustment, a predetermined quantity of feed or other granular material is immediately delivered to the desired location.

A further object of this invention is to provide feed dispensing units which can be easily added to existing screw conveyor equipment that require a minimum of maintenance attention, and can be easily operated by even the most unskilled of farm and ranch personnel.

A still further object of the invention is to provide feed dispensing units that are at all times filled with feed and which permit complete and accurate control of the feed delivered to a particular animal.

Another object of the invention is to provide dispensing units that are adapted to be fixedly positioned above the feeding troughs, from each of which units a flexible transparent chute depends downwardly and conducts dispensed feed to the trough, with the lower end of each chute being so located relative to the trough that but a predetermined quantity of feed is initially discharged into and maintained in the trough during the feeding period.

A still further object of the invention is to provide a dispensing unit and chute associated therewith that are substantially enclosed and therefore protect the major portion of the feed from contact with flies or other insects, rodents, vermin, and the like, to insure greater health protection for the stock.

Another object of the invention is to provide positive means for insuring that each animal is fed a predetermined quantity of grain, with distribution of the grain or other food to particular feeding trough locations being made rapidly by a simple manual operation.

Yet another objective of the invention is to supply dispensing units that at all times maintain the feed in a clean, sanitary condition, are of a simplified mechanical structure, can be easily fabricated of standard, commercially available materials, do not require elaborate plant facilities for their manufacture whereby these units can be retailed at a sufficiently low cost to encourage their widespread use.

These and other objects and advantages of the invention will become apparent from the following description of a preferred form thereof when taken in conjunction with the accompanying drawing illustrating that form in which:

Figure 1 is a perspective view of a screw conveyor showing two dispensing units associated therewith in spaced relationship;

Figure 2 is a vertical cross-sectional view of one dispensing unit taken on line 2—2 of Figure 1;

Figure 3 is a combined side elevational and vertical cross-sectional view of the dispensing unit taken on line 3—3 of Figure 2;

Figure 4 is a perspective view of the manually operated actuating cam;

Figure 5 is a perspective view of the compartment-defining plate segments;

Figure 6a is a diagrammatic view of the dispensing unit when the cam has been manually moved to permit discharge of feed from a first compartment;

Figure 6b is a diagrammatic view of the unit showing a portion of the cam when feed is discharged from a second compartment;

Figure 6c is a diagrammatic view of the dispensing unit shown after the cam has been rotated to a position which permits discharge of feed from two compartments;

Figure 7 is a perspective view of a series of dispensing units and associated chutes in relation to the feeding trough into which dispensed feed is discharged;

Figure 8 is a combined horizontal cross-sectional view and top plan view showing the feeding trough and the position of one of the chutes leading thereto;

Figure 9 is a vertical cross-sectional view of the conveyor system used in delivering feed to one of the dispensing units;

Figure 10 is a horizontal cross-sectional view of a portion of the conveyor system taken on line 10—10 of Figure 9;

Figure 10a is a vertical cross-sectional view of the conveyor system taken on line 10a—10a of Figure 9;

Figure 11 is a horizontal cross-sectional view of a portion of a unit taken on line 11—11 of Figure 9;

Figure 12 is a side elevational view of the manually operated actuating cam; and Figure 13 is a perspective view of the plate device utilized in reducing the volume of the compartments in the dispensing units.

Referring now to the drawing, and particularly Figures 1, 2, 3, 7 and 9, for the general arrangement of the invention, it will be seen to include an elongate, substantially horizontal trough E that is in communication with a number of dispensing units R, further identified specifically as units R-1, R-2, R-3 and R-4. Each dispensing unit R has a vertically disposed, slightly tapering chute F associated therewith and depending therefrom, which for purposes of clarity herein are individually identified as chutes F-1, F-2, F-3 and F-4. These chutes terminate above the surface of an elongate feeding trough G into which feed is discharged for animals H, as seen in Figures 7 and 8. A rotatable screw conveyor J is horizontally mounted within the confines of trough E. This conveyor is preferably of the type shown and described in my pending application Serial No. 452,893, entitled Apparatus and Method for Forming a Helical Screw, filed on the 30th day of August, 1954.

A vertical housing K communicates with one end of upper trough E and extends downwardly therefrom. Two laterally spaced vertical screw conveyors L are mounted in housing K that are driven by an electric motor or other prime mover M. These dual screw conveyors L serve to raise granular feed or grain to the communicating end portion of trough E, after which it is moved longitudinally therein by screw conveyor J to fill the dispensing units R, as will later be described in detail. A second elongate housing N is horizontally positioned below trough E (Figure 9) and is connected at one end to the lower interior portion of housing K. The other end of housing N is connected to a storage area for feed (not shown). A power-driven screw conveyor O located within the confines of housing N serves to convey feed therethrough from the storage area to the lower interior portion of housing K. Although housing N is shown in Figure 9 as being parallel to trough E, it will be apparent that such arrangement is not essential and that the direction from which housing N is brought into communication with housing K will be dictated by the lay-out of the particular installation.

In detailed structure, as best shown in Figures 1, 7 and 9, trough E is preferably fabricated from two side members 10 and 12, and a series of elongate bottom members 14 are welded or otherwise affixed to the lower interior portions thereof. Longitudinally spaced extensions 10a and 12a depend downwardly from side members 10 and 12 respectively. As will be explained in detail hereinafter, these extensions form portions of the receptacles R. Extensions 10a and 12a are defined by parallel, vertical edges 16 and 18 and lower edges 20 and 22 that taper inwardly toward one another.

At positions spaced inwardly from edges 16 and 18, the bottoms 14 of trough E angle downwardly to define parallel, vertically extending end walls 24 which in turn develop at their lower portions into downwardly and inwardly tapering end wall extensions 26. The two extensions 26 cooperate with extensions 10a and 12a to define a restricted discharge orifice 28 (Figure 3). Walls 24 and the extensions 26 thereof are preferably formed with flanges 24a and 26a that are riveted or otherwise affixed to the interior surfaces of extensions 10a and 12a as shown.

Three transversely disposed, longitudinally spaced bolts 30, 32 and 34 are provided in each receptacle R that extend between extensions 10a and 12a. Bolts 30, 32 and 34 engage transversely positioned eyes formed in the upper portions of vertically extending panels 36, 38 and 40. As best seen in Figure 3, these panels, together with end walls 24 and extensions 10a and 12a cooperatively define the upper portions of compartments C and B respectively. Panels 36, 38 and 40 cooperate with extensions 10a and 12a to define the upper portions of two vertically extending compartments D and A.

Four transverse shafts 42, 44, 46 and 48 are preferably journaled in replaceable, self-lubricating roller bearings (not shown) mounted on extensions 10a and 12a. Shafts 42, 44, 46, and 48 pass through eyes formed in rectangular valve plates 42a, 44a, 46a and 48a, respectively, and are rigidly affixed thereto. End portions of shafts 42 to 48 each project through openings formed in extension 10a, to which end portions (Figure 2) levers 42b, 44b, 46b and 48b are rigidly attached by set screws or other conventional means. Levers 42b, 44b, 46b and 48b have cam follower rollers 42c, 44c, 46c and 48c rotatably mounted on the outer end portions thereof by pins or other conventional roller-supporting means.

A transversely disposed shaft 50 is rotatably mounted within the confines of a sleeve 52 that extends through openings 54 and 56 formed at substantially the center of extensions 10a and 12a respectively. Sleeve 52 in turn is disposed within the confines of a tubular bushing 56, the ends of which abut against the interior surfaces of extensions 10a and 12a.

A four-point involute, positive-acting cam and indexing dial P, as shown in Figure 4, is provided which in detail includes a circular plate 58 embodying a central hub or boss 60 in which a bore is transversely formed that permits the cam to be mounted on an outwardly extending portion 50a of shaft 50. The opposite end 50b of shaft 50 is threaded and has a nut 51 threaded thereon. Cam P is rigidly affixed to shaft portion 50a by means of a set screw 62 that is threaded into the hub or boss 60. Shaft portion 50a develops into a section 64 disposed normal thereto that preferably terminates in a ball 66. Section 64 and ball 66 cooperatively serve as a handle, hereinafter referred to by the letter S, for manually rotating the cam and indexing dial P.

Three circumferentially spaced, radially extending arrows U, V and W are formed or imprinted on the exterior surface of cam face 38 (Figure 1). An arrow X, or other indicia, is formed or imprinted on each extension 10a to serve as a reference when cam and indexing dial P is rotated by handle S, as will be further explained hereinafter. A circumferentially extending rim 68 projects rearwardly from cam face 58. In cooperation with a rearwardly projecting heart-shaped flange 70 and a convex-concave segment 72, rim 68 defines a cam path 74 in which the cam follower rollers 42c, 44c, 46c and 48c are disposed. The major portion of cam path 74 is circular, but it has a section 74a defined by segment 72 and a portion of flange 70 that is angular in shape.

Valve plates 42a, 44a, 46a and 48a are so mounted on shafts 42, 44, 46 and 48 as are levers 42b, 44b, 46b and 48b that the bottoms of compartments C, D, A and B are closed when the cam and indexing dial P is in the position shown in Figure 3. An extension panel 38a depends below panel 38, and the lower edges of valve plates 44a and 46a can be disposed to abut thereagainst.

When the cam and indexing dial P is moved in a clockwise direction from the position shown in Figure 3 to that of Figure 6a, the cam follower roller 46c enters the cam path portion 74a, and lever 46b is pivoted to move valve plate 46a to the open position whereupon feed or granular material in compartment A discharges downwardly therefrom through orifice 28. Rotation of the cam and indexing dial P in a counter-clockwise direction from the position shown in Figure 3 to that illustrated in Figure 6b causes the cam follower roller 44c to be pivoted to move valve plate 44a to the open position. When valve plate 44a is placed in the open position feed or granular material in compartment D is permitted to discharge downwardly therefrom through orifice 28.

After the material in either compartment A or D has been discharged as above described, the cam and indexing dial P can be further rotated to place portion 74a of the cam path in a position exactly opposite from that occupied in Figure 3 and as shown in Figure 6c. Rollers 42c and 48c concurrently occupy cam path portion 74a when the cam and indexing dial P occupies this latter position, and as can be seen in Figures 6c, plates 42a and 48a are moved to open positions to permit discharge of material from compartments C and B. After discharge of material from one or all of the compartments the handle S can be used to return cam and indexing dial P to the position shown in Figure 3 where all of the compartments are closed by the valve plates 42a, 44a, 46a and 48a.

A plurality of dots Z or other indicia are formed on the external face of indexing dial P between arrows U, V and W. When dial P is rotated in either of two possible directions to bring one of the indicia Z in alignment with marker X, one of the compartment plates 42a, 44a, 46a or 48a is placed in the open position as shown in Figures 6a, 6b or 6c. Further rotation of the dial P to a position where one of the arrows U, V or W is in alignment with marker X places the previously opened compartment plate, as well as the balance of the compartment plates, in closed positions. It will be particularly noted that two indicia Z are disposed between arrows V and W, and accordingly when the dial P is rotated to move the segment thereof between arrows V and W past marker X, the valve plates 42a and 48a are opened during this movement to dispense feed material from compartments B and C. If but one of the indicia Z between arrows V and W is brought into alignment with marker X, only one compartment plate will be placed in the open position and feed discharged from but one compartment.

Prior to use in the above-described manner, the receptacles R must first, of course, be filled with the feed material to be dispensed therefrom. The receptacles may be filled by completing an electric circuit motor M and to the motor (not shown) that rotates conveyor O. Motor M is provided with a drive pulley 80 which engages an endless belt 82 that extends to and engages a driven pulley 84 which is mounted on the lower end of a vertical shaft 86. Shaft 86 is rotatably supported in suitable bearings 88 disposed adjacent housing K. A beveled gear 90 is mounted on the upper end of shaft 86 that engages a second beveled gear 92 mounted on an end portion 94 of screw conveyor J. A driving sprocket 96 is mounted on the lower end portion of shaft 86 that engages a chain belt 98 which extends to and engages two sprockets 100 mounted on the lower ends of screw conveyors L. Conveyors L, as well as conveyors J and O are rotatably supported in bearings 102, as described in detail in my pending application, Serial No. 452,893.

An elongate plate 104 is pivotally supported by a transversely disposed pin 106, or other suitable means, within the confines of the dead end 108 of trough E. A normally closed electrical switch 110 provided with an actuating member 111 is positioned above the free end of plate 104 in trough E. When plate 104 pivots upwardly, actuating member 111 is contacted and moved to place switch 110 in an open position. Switch 110 is included in the circuit of two insulated electrical conductors 112 and 114 which are connected to a source of electrical power (not shown) and to motor M and the motor (not shown) used in driving screw conveyor O.

When electrical power is supplied to motor M and the other motor (not shown), the conveyor O rotates to supply granular feed material to the lower portion of housing K, from where the material is lifted by the dual screw conveyors L in housing K to one end of trough E. Conveyor J, which is rotated by shaft 86, moves granular material delivered to trough E toward the dead end 108 thereof. As the granular feed is moved along trough E, receptacles R-1, R-2, R-3, R-4 are in turn filled therewith, with the rotating screw conveyor J filling each receptacle R to the same elevation. It will be apparent that during filling of the receptacles, each cam and index dial P thereon should be disposed in a position where one of the indicia Z is out of alignment with marker X.

After all the receptacles R are filled, the screw conveyor J continues to advance granular material toward the dead end 108 of trough E, and when this material can travel no further it will pile up under pivot plate 104 to move same upwardly until it contacts and moves actuating member 111 sufficiently to place switch 110 in the open position. The electrical circuit comprising conductors 112, 114 is then broken, and motor M and the motor (not shown) that drives conveyor O stop operating. Circuit 112, 114 will not be completed until feed is discharged from receptacle R-4 to permit plate 104 to pivot downwardly to the position shown in solid line in Figure 9.

Should it be desired to reduce the volume of the compartments A, B, C and D, this can be easily and quickly accomplished by means of pairs of sheet metal members 120, as shown in Figure 13. Each pair 120 includes two inverted L-shaped sections 122 that are connected to a common flange 124. A space 126 separates sections 122 from one another. Each pair of members is used by inserting flange 124 in a slot 128 formed in one of the panels 36, 38 or 40 (Figures 9 and 13).

It will be particularly noted that the food material dispensed is at all times in a sanitary condition, free from flies or other insects and foreign matter. The trough side walls 10 and 12 terminate in longitudinally extending lips 130 and 132, respectively. These lips 130 and 132 removably engage elongate sheet metal tops 134 provided with snap-on side members 134a and 134b, as can best be seen in Figure 1.

In use, operation of the invention is extremely simple. Before the receptacles R are filled with feed material, the handles S are all rotated to positions where each cam and indexing dial P is in the position shown in Figure 3, whereby the valve plates close the bottoms of compartments C, D, A and B. Switch 110 is then closed to energize the motor M and the motor (not shown) that drives the screw conveyor O. Feed is transferred from the storage area (not shown) through housing N to the bottom of housing K where the dual screw conveyors L raise the feed to one end of trough E. The rotating screw conveyor J then moves the feed longitudinally within trough E toward the dead end 108 thereof whereby each of the receptacles R-1, R-2, R-3 and R-4 are sequentially filled with the feed material. It will be understood that there is no limitation as to the number of receptacles associated with the trough E, but in Figure 7 only four such receptacles are shown. Conveyor J levels feed contained in each receptacle, and accordingly each receptacle contains an identical amount of feed or other granular material. When it is desired to dispense a predetermined quantity of feed to a particular location in the feeding trough G, the receptacle located directly above this location is utilized by rotating handle S to a position where the bottom of compartment A is opened (Figure 6a), the bottom of compartment D is opened (Figure 6b), or the bottoms of compartments B and C are opened individually or together (Figure 6c).

As feed discharges from the receptacles R it passes downwardly through one of the chutes F-1, F-2, F-3 or F-4. The bottoms of these chutes are positioned sufficiently close to the upper surface of the feeding trough G that material will discharge from the chutes in piles in the feeding trough, whereupon additional material will not discharge from the chutes until these piles are depleted by the animals H feeding thereon. Chutes F-1, F-2, F-3 and F-4 are preferably formed of transparent material such as one of the numerous synthetic plastic materials that are available for this purpose. As previously mentioned, arrows U, V and W are formed or imprinted on the external surface of plate 58 of the cam and indexing dial P. These arrows in combination with indicia Z, also marked on plate 58 between the arrows, serve to indicate the rotative position of the cam P relative to the marker X shown in Figure 1. Thus, when the cam P is rotated to place one of the indicia Z in alignment with marker X the operator knows that a particular one of the valve plates of the invention is in an open position to permit discharge of feed from one of the compartments. Likewise, when one of the arrows U, V or W is in alignment with marker X the operator knows that all of the compartments are in the closed position. Upon actuation of motor M, the invention will continue to operate until all of the receptacles R are filled with grain or other granular feed material. Thereafter the feed will continue to be moved toward the dead end 108 of the trough E until such time as plate 104 is pivoted upwardly by accumulated grain or feed material to sufficiently move the acuating member 111 that the switch 110 is placed in the open position and breaks the circuit defined by the conductors 112 and 114.

Upon completion of the feeding operation after predetermined quantities of feed material is discharged from the receptacles R, the plate 104 by means previously described is pivoted back to the position shown in solid line in Figure 9, and the actuating member 111 placed in a position to close the electrical circuit defined by conductors 112 and 114. Motor M then starts, as does the motor (not shown) that drives the screw conveyor O, and the receptacles R are again filled with grain to be dispensed in predetermined quantities as previously described in detail. Should it be desired to restrict the volume of material in the compartments, the members 122 shown in Figure 13, can be utilized for this purpose.

In some instances it is desirable to use two conveyors J and J' of identical construction in moving grain or other granular material in the trough E. When two conveyors J and J' are so employed (Figure 10a), they are preferably driven from the same source of power so that their rotation is synchronized, with the spiral defining portions thereof overlapping as illustrated by phantom line 101. In practice, it has been found that a smoother, more efficient movement of grain or granular material is effected in trough E when two conveyors J and J' are used rather than a single conveyor J.

Although the invention is fully capable of achieving the results and providing the advantages hereinbefore mentioned, it is to be understood that it is merely the presently preferred embodiment thereof, and that I do not mean to be limited to the details of construction above described other than as defined in the appended claims.

I claim:

1. A device for selectively dispensing any one of a plurality of predetermined quantities of granular material in a desired location including: a granular material receiving receptacle open at both the top and bottom and having an inwardly tapered bottom portion; a trough through which said granular material can be discharged into said open end of said receptacle; a plurality of fixed panels substantially vertically disposed in said receptacle that co-operate therewith to define a plurality of open ended compartments, said panels terminating above the interior surface of said tapered portion, an intermediately disposed one of said panels having a depending extension; a plurality of pivotally supported plates having an upper and lower edge disposed in said receptacle such that the lower edges of at least a portion of said plates contact the interior surface of said tapered bottom portion when in a first position and the remaining portion of said plates when in a first position are in contact with said depending extension; a plurality of shafts for pivotally supporting said plates in said receptacle, each of said plates being rigidly affixed to a respective one of said shafts, each of which plates when in a first position closes the lower portion of one of said compartments and each of which plates when in a second position permits granular material disposed in one of said compartments to be discharged therefrom through said lower open end of said receptacle; each of said shafts having a rigid lever affixed thereto, each of which levers when pivoted a predetermined distance moves the respective plate from said first to said second position; said manually operable means being a cam rotatable relative to said levers whereby said plates are moved in sequence from said first to said second positions.

2. A device for selectively dispensing any one of a plurality of predetermined quantities of granular material in a desired location including: a granular material receiving receptacle open at both the top and bottom and having an inwardly tapered bottom portion; a trough through which said granular material can be discharged into said open end of said receptacle; a plurality of fixed panels substantially vertically disposed in said receptacle that co-operate therewith to define a plurality of open ended compartments, said panels terminating above the interior surface of said tapered portion, an intermediately disposed one of said panels having a depending extension; a plurality of pivotally supported plates having an upper and lower edge disposed in said receptacle such that the lower edges of at least a portion of said plates contact the interior surface of said tapered bottom portion when in a first position and the remaining portion of said plates when in a first position are in contact with said depending extension; a plurality of shafts for pivotally supporting said plates in said receptacle, each of said plates being rigidly affixed to a respective one of said shafts, each of which plates when in a first position closes the lower portion of one of said compartments and each of which plates when in a second position permits granular material disposed in one of said compartments to be discharged therefrom through said lower open end of said receptacle; each of said shafts having a rigid lever affixed thereto, each of which levers when pivoted a predetermined distance moves the respective plate from said first to said second position; said manually operable means being a cam rotatable relative to said levers, rollers mounted upon each of said levers, said cam defining a cam path in which said rollers are disposed, and a crank rigidly connected to said cam for turning said cam whereby said plates are moved in sequence from said first to said second positions.

3. A device for selectively dispensing any one of a plurality of predetermined quantities of granular material in a desired location including: a granular material receiving receptacle open at both the top and bottom and having an inwardly tapered bottom portion; a trough through which said granular material can be discharged into said open end of said receptacle; a plurality of fixed panels substantially vertically disposed in said receptacle that co-operate therewith to define a plurality of open ended compartments, said panels terminating above the interior surface of said tapered portion, an intermediately disposed one of said panels having a depending extension; a plurality of pivotally supported plates having an upper and lower edge disposed in said receptacle such that the lower edges of at least a portion of said plates contact the interior surface of said tapered bottom portion when in a first position and the remaining portion of said plates when in a first position are in contact with said depending extension; a plurality of shafts for pivotally supporting said plates in said receptacle, each of said plates being rigidly affixed to a respective one of said shafts, each of which plates when in a first position closes the lower portion of one of said compartments and each of which plates when in a second position permits granular material disposed in one of said compartments to be discharged therefrom through said lower open end of said receptacle; each of said shafts having a rigid lever affixed thereto, each of which levers when pivoted a predetermined distance moves the respective plate from said first to said second position; said manually operable means being a cam rotatable relative to said levers, rollers mounted upon each of said levers, said cam defining a cam path in which said rollers are disposed, and a crank rigidly connected to said cam for turning said cam, said cam path including a straight portion, each of said rollers when said cam is rotated to cause it to enter said straight portion, pivoting said lever associated with that particular one of said rollers to pivot to the extent that said plate segment associated therewith moves from said first to said second position.

4. A device for selectively dispensing any one of a plurality of predetermined quantities of granular material at any one of a plurality of specific locations including: a plurality of spaced granular material receiving units that are open at both the tops and bottoms; a trough affixed to said units through which said granular material can be discharged into said open upper ends of said units; a screw conveyor disposed in said trough, which conveyor when rotated moves the granular material to said units; a plurality of fixed panels disposed in each of said units that cooperate therewith to define portions of a plurality of open-ended compartments; a plurality of plates disposed in each of said units; means that pivotally support said plates in each of said units, each of which plates when in a first position closes the lower portion of one of said compartments, and each of which plate segments when in a second position permits said granular material disposed in one of said compartments to discharge therefrom; and manually operable means on each of said units that sequentially moves each of said plate segments in said unit on which it is mounted from said first to said second positions.

5. In a device for selectively dispensing any one of multiple quantities of granular material at a desired location, means for predetermining said quantities comprising: a vertically disposed receptacle open at the top and bottom end; a plurality of vertical panels positioned in said receptacle that cooperate therewith to define a plurality of open ended compartments, a plurality of valve plate means adapted to open and close the bottom end of said compartments to define a material holding volume; and means for predetermining said volume including a vertically disposed sheet metal member removably positioned within one of said compartments, said sheet metal member defining a wall of said compartment, and means for spacing said sheet metal member a predetermined distance from a wall of said receptacle.

6. In a device for dispensing granular material selectively from a plurality of vertically disposed open ended receptacles which are longitudinally spaced and depending from a horizontally disposed material conveyor trough, means for filling each of said receptacles comprising: a screw conveyor disposed in said trough, which conveyor when rotated moves granular material to the upper open end of each of said receptacles from an open end of said trough toward a closed end thereof; a pivot plate positioned in said trough, a shaft proximate the closed end of said trough, said shaft being horizontally disposed transverse to the direction of movement of said granular material and above said conveyor screw, said pivot plate being pivotally mounted proximate the closed end of said trough upon said shaft, a forward end of said pivot plate extending toward said closed end and positioned above the material receiving receptacle nearest said closed end of said trough, said forward end of said plate being inclined forwardly and downwardly with respect to the horizontal plane; an electrical switch positioned above said forward end of said pivot plate whereby upward movement of said pivot plate actuates said switch to stop the rotation of said screw conveyor.

7. A device for selectively dispensing any one of multiple quantities of granular material at a desired location including: a vertically disposed receptacle open at both the top and bottom, said receptacle being formed with an inwardly tapered bottom portion; a plurality of spaced substantially vertical panels positioned in said receptacle that cooperate therewith to define a plurality of open-ended compartments, said panels terminating above the interior surface of said tapered portion of said receptacle, an intermediately positioned one of said panels having a depending extension; a plurality of valve plates positioned in said receptacle, said valve plates being generally rectangular in configuration with an upper and lower edge, said valve plates being so disposed in said receptacle that the upper edge of each of said valve plates is positioned proximate a respective one of said panels and the lower edge of at least a portion of said plates when in a first position contact the interior surface of said tapered bottom portion of said receptacle, the lower edge of the remaining portion of said valve plates when in a first position being in abutting contact with said extension; a plurality of shafts pivotally supported within said receptacle at the upper edges of said valve plates, each of said valve plates being rigidly affixed to a respective one of said shafts, said shafts supporting said valve plates in said receptacle such that said valve plates are substantially vertically disposed and are pivotal from said vertical position, each of said plates when in said first position closes the lower portion of a respective one of such compartments, each of said plates when in a second position opening the lower portion of the respective one of the compartments associated therewith to permit discharge of said material from said compartment through said lower open end of said receptacle; a plurality of levers each of which is rigidly affixed to a respective one of said shafts, each of said levers when pivoted a predetermined distance moving a respective one of said valve plates between said first and second positions; a manually rotatable cam rotatable relative to said levers to move said valve plates in sequence from said first to said second positions and from said second to said first positions to permit discharge of predetermined quantities of material or multiples thereof from said receptacle; and a roller mounted on each of said levers to rotatably engage said cam.

8. A device for selectively dispensing any one of multiple quantities of granular material at a desired location including: a vertically disposed receptacle open at both the top and bottom, said receptacle being formed with an inwardly tapered bottom portion; a plurality of spaced substantially vertical panels positioned in said receptacle that cooperate therewith to define a plurality of open-ended compartments, said panels terminating above the interior surface of said tapered portion of said receptacle, an intermediately positioned one of said panels having a depending extension; a plurality of valve plates positioned in said receptacle, said valve plates being generally rectangular in configuration with an upper and lower edge, said valve plates being so disposed in said receptacle that the upper edge of each of said valve plates is positioned proximate a respective one of said panels and the lower edge of at least a portion of said plates when in a first position contact the interior surface of said tapered bottom portion of said receptacle, the lower edge of the remaining portion of said valve plates when in a first position being in abutting contact with said extension; a plurality of shafts pivotally supported within said receptacle at the upper edges of said valve plates, each of said valve plates being rigidly affixed to a respective one of said shafts, said shafts supporting said valve plates in said receptacle such that said valve plates are substantially vertically disposed and are pivotal from said vertical position, each of said plates when in said first position closes the lower portion of a respective one of such compartments, each of said plates when in a second position opening the lower portion of the respective one of the compartments associated therewith to permit discharge of said material from said compartment through said lower open end of said receptacle; a plurality of levers each of which is rigidly affixed to a respective one of said shafts, each of said levers when pivoted a predetermined distance moving a respective one of said valve plates between said first and second positions; a manually rotatable cam rotatable relative to said levers to move said valve plates in sequence from said first to said second positions and from said second to said first positions to permit discharge of predetermined quantities of material or multiples thereof from said receptacle; and a roller mounted on each of said levers to rotatably engage said cam, said cam including a circular plate having cam path defining means supported on the rear face thereof that are engaged by said rollers, and circumferentially spaced indicia disposed on the forward face of said plate, each of said indicia when aligned with a reference point on said receptacle indicating the position of a respective one of said valve plates.

9. A device for selectively dispensing any one of multiple quantities of granular material at a desired location including: a vertically disposed receptacle open at both the top and bottom ends thereof, said receptacle having opposed side walls with inwardly tapered bottom portions; a plurality of spaced substantially vertical panels positioned in said receptacle that cooperate therewith to define a plurality of open-ended compartments, said vertical panels including first and second side panels spaced from the opposed side walls of said receptacle and terminating at a position proximate the tapered portion of said side walls, and an intermediate panel positioned between said first and second side panels, said intermediate panel depending downwardly beyond the termination of said first and second side panels and into the tapered portion of said receptacle; a plurality of valve plates positioned in said receptacle, each of said valve plates being pivotally supported from a position proximate the lower edge of a respective one of said first and second side panels, said valve plates being substantially vertically disposed and pivotable from said vertical position, each of said plates when in a first position closes the lower portion of a respective one of such compartments whereby each of said compartments has a tapered bottom surface in the closed position, each of said plates when in a second position opening the lower portion of the respective one of the compartments associated therewith to permit discharge of said material from said compartment through said lower open end of said receptacle; and a manually operable means for moving each of said valve plates in sequence from said first to said second positions and from said second to said first positions to permit discharge of predetermined quantities of said material or multiples thereof from said receptacle.

10. A device for selectively dispensing any one of multiple quantities of granular material at a desired location including: a vertically disposed receptacle open at both the top and bottom ends thereof, said receptacle having opposed side walls vertically oriented with an inwardly tapered lower portion; a plurality of spaced substantially vertical panels positioned in said receptacle that cooperate therewith to define a plurality of open-ended compartments, said plurality of vertical panels comprising first and second side panels spaced inwardly from the opposed vertically oriented side walls of said receptacle, said first and second side panels each having a lower edge substantially horizontally aligned with the lower end of said vertically oriented side walls, and an intermediate panel spaced between said side panels, said intermediate panel depending downwardly beyond said horizontal position and into the tapered portion of said receptacle; a plurality of valve plates positioned in said receptacle, said plurality of valve plates comprising first and second pairs of valve plates associated respectively with said first and second side panels, said valve plates in each of said pairs being individually pivotally mounted proximate the lower end of said respective panel whereby one of said plates is in pivotal contact with the tapered portion of said side wall of said receptacle and the other of said plates is in pivotal contact with said intermediate panel, whereby each of said compartments has a tapered bottom end closure when each of said valve plates is in a closed position, each of said valve plates being pivotable from said closed position to an open position to open the lower portion of said compartment associated therewith to permit discharge of said material from said compartment through said lower end of said receptacle; and a manually operable means for moving each of said valve plates in sequence from said open to said closed position and from said closed to said open position to permit discharge of said predetermined quantities of material or multiples thereof from said receptacle.

References Cited in the file of this patent

UNITED STATES PATENTS

| | | |
|---|---|---|
| 1,232,119 | Summers | July 3, 1917 |
| 1,407,333 | McConnell | Feb. 21, 1922 |
| 2,323,583 | Wilson | July 6, 1943 |
| 2,721,678 | Gill | Oct. 25, 1955 |
| 2,743,860 | Saxe | May 1, 1956 |

FOREIGN PATENTS

| | | |
|---|---|---|
| 28,117 | Great Britain | Nov. 5, 1914 |